United States Patent
Dropps et al.

(10) Patent No.: US 9,172,602 B1
(45) Date of Patent: Oct. 27, 2015

(54) METHOD AND SYSTEM FOR AUTO-NEGOTIATION

(71) Applicant: QLOGIC, Corporation, Aliso Viejo, CA (US)

(72) Inventors: Frank R. Dropps, Maple Grove, MN (US); Ernest G. Kohlwey, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 393 days.

(21) Appl. No.: 13/678,418

(22) Filed: Nov. 15, 2012

(51) Int. Cl.
*H04L 12/935* (2013.01)
*H04L 12/24* (2006.01)

(52) U.S. Cl.
CPC .................................. *H04L 41/0803* (2013.01)

(58) Field of Classification Search
None
See application file for complete search history.

(56) References Cited

U.S. PATENT DOCUMENTS

| | | | |
|---|---|---|---|
| 2004/0208180 A1* | 10/2004 | Light et al. | 370/395.2 |
| 2008/0013457 A1* | 1/2008 | Berman et al. | 370/245 |
| 2008/0317069 A1* | 12/2008 | Huang et al. | 370/503 |
| 2010/0077097 A1* | 3/2010 | Brown et al. | 709/233 |
| 2010/0229067 A1* | 9/2010 | Ganga et al. | 714/752 |
| 2012/0076139 A1* | 3/2012 | Tanizawa | 370/389 |
| 2012/0236722 A1* | 9/2012 | Patel et al. | 370/235 |
| 2014/0098702 A1* | 4/2014 | Fricker | 370/254 |

* cited by examiner

*Primary Examiner* — Andrew Chriss
*Assistant Examiner* — John LeQuang
(74) *Attorney, Agent, or Firm* — Klein, O'Neill & Singh, LLP

(57) ABSTRACT

Methods and systems for negotiating between a first network device and a second network device connected to a network, is provided. The method determining if a first port of the first network device having a plurality of Sub-Ports, is auto-negotiation enabled; wherein the plurality of Sub-Ports can be configured to operate independently as a port for sending and receiving information using one of a plurality of network links at a plurality of rates complying with a plurality of protocols; configuring any one or more of the Sub-Ports as one quad lane, two dual lane, one dual lane and two single lane, or four single lane ports; determining if lanes of the first port are physically swapped by identifying which one or more of the Sub-Ports will operate as a lane 0 for communicating with a particular lane 0 of the second network device; and processing auto-negotiation on all lanes.

18 Claims, 13 Drawing Sheets

METHOD AND SYSTEM FOR AUTO-NEGOTIATION

BACKGROUND

The present disclosure relates to networks and network devices.

RELATED ART

Networking systems are commonly used to move network information (which may also be referred to interchangeably, as frames, packets or commands) between computing systems (for example, servers) or between computing systems and network devices (for example, storage systems). Various hardware and software components are used to implement network communication.

A network switch is typically a multi-port device where each port manages a point-to-point connection between itself and an attached system. Each port can be attached to a server, peripheral, input/output subsystem, bridge, hub, router, or another switch where each of the aforementioned network devices also has one or more ports. The term network switch as used herein includes a Multi-Level switch that uses plural switching elements within a single switch chassis to route data packets. Different network and storage protocols may be used to handle network information and storage information. Continuous efforts are being made to enhance the use of networking and storage protocols.

SUMMARY

In one embodiment, a method for negotiating between a first network device and a second network device connected to a network is provided. The method includes determining if a first port of the first network device having a plurality of Sub-Ports, is auto-negotiation enabled; wherein the plurality of Sub-Ports can be configured to operate independently as a port for sending and receiving information using one of a plurality of network links at a plurality of rates complying with a plurality of protocols; configuring any one or more of the Sub-Ports as one quad lane, two dual lane, one dual lane and two single lane, or four single lane ports; determining if lanes of the first port are physically swapped by identifying which one or more of the Sub-Ports will operate as a lane 0 for communicating with a particular lane 0 of the second network device; and processing auto-negotiation on all lanes.

In an additional embodiment, a system is provided. The system includes first network device coupled to a second network device via a network. The first network device comprises: a processor for executing firmware code; and a first port having a plurality of Sub-Ports that can be configured to operate independently as a port for sending and receiving information using one of a plurality of network links at a plurality of rates complying with a plurality of protocols.

The processor executable firmware: determines if the first port of the first network device is auto-negotiation enabled; configures any one or more of the Sub-Ports as one quad lane, two dual lane, one dual lane and two single lane, or four single lane ports; determines if lanes of the first port are physically swapped by identifying which one or more of the Sub-Ports will be configured to operate as a lane 0 for communicating with a particular lane 0 of the second network device; and processes auto-negotiation on all lanes.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 1 is a functional block diagram of a network that the present embodiments may be used in connection with;

DETAILED DESCRIPTION

Figure 1:
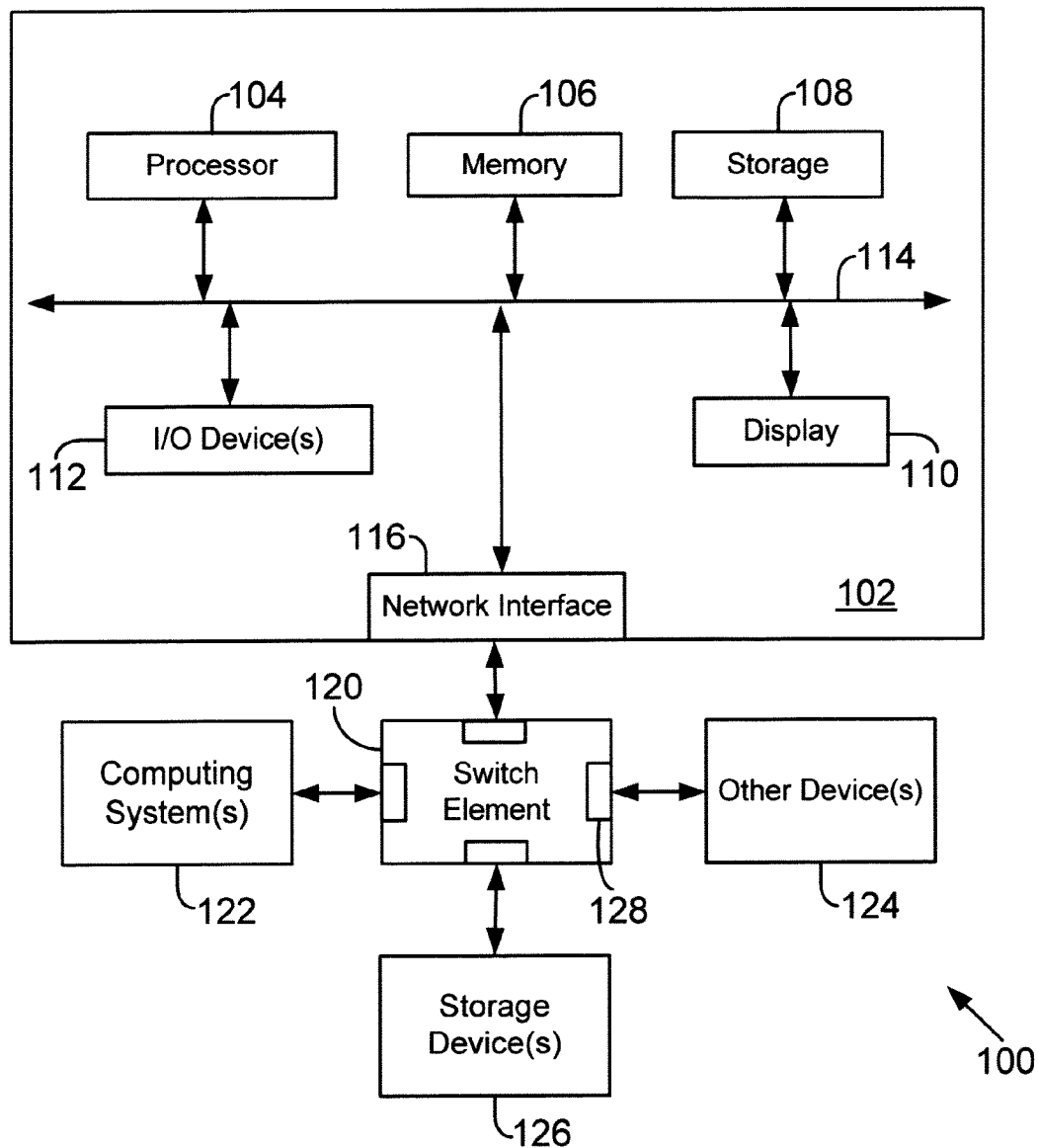

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

Various network standards and protocols may be used to enable network communications using the disclosed embodiments, including Fibre Channel (FC), Fibre Channel over Ethernet (FCoE), Ethernet, and others. Below is a brief introduction to some of these standards. The present embodiments are described herein with reference to the Fibre Channel, FCoE and Ethernet protocols. However, these protocols are used merely for ease of reference and to provide examples. The present embodiments are not limited to Fibre Channel, FCoE and Ethernet.

Fibre Channel (FC) is a set of American National Standards Institute (ANSI) standards. Fibre Channel provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches (or other devices, for example, adapters) use memory buffers to temporarily hold frames that are received and sent across a network. Associated with these buffers are credits, which are the number of frames that a buffer can hold per Fabric port.

Fibre Channel devices use the concept of "credits" for managing flow control when sending and receiving information. Typically, before a transmit port can transmit frames, a receiving port sends credit to the transmitting port indicating the number of frames that the receiving port can hold. The credits are based on the space that may be available at the receiving port, at any given time. Thus the transmitting port is only permitted to transmit frames when it has the necessary credits from the receiving port. This prevents situations where the receiving port may overflow with received frames. Fibre Channel ports use special primitives for providing credits. One such primitive is called an R-RDY that is used by a receiving port to grant credit to a transmit port. Another primitive is a VC_RDY primitive that is used when the receiving port is configured to use virtual lanes (or virtual circuits). Details regarding the use of R-RDYs and VC_RDYs are not germane to the adaptive embodiments disclosed herein.

Ethernet is a family of computer networking technologies for local area networks (LANs). Systems communicating over Ethernet divide a stream of data into individual packets called frames. Each frame contains source and destination addresses and error-checking data so that damaged data can be detected and re-transmitted. Ethernet is standardized in IEEE 802.3, which is incorporated herein by reference in its entirety. Ethernet uses "Pause" frames for managing flow control. In Ethernet, a receive buffer may send a Pause frame indicating to the transmitting Ethernet port that it cannot receive a frame. Thus in this case, implicitly, the transmitting port is out of credit.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel frames are encapsulated in Ethernet frames. Encapsulation allows Fibre Channel to use 1 Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module)

104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 102 also includes a network interface 116 for communicating with other computing systems 122, storage devices 126, and other devices 124 via a switch element 120 and various links. The network interface 116 may comprise a network interface card (NIC) or any other device for facilitating communication between the host system 102, other computing systems 122, storage devices 126, and other devices 124. The network interface 116 may include a converged network adapter, such as that provided by QLogic Corporation for processing information complying with storage and network protocols, for example, Fibre Channel and Ethernet. As an example, the network interface 116 may be an FCoE adapter. In another embodiment, the network interface 116 may be a host bus adapter, for example, a Fibre Channel host bus adapter, such as that provided by QLogic Corporation. Details regarding the network interface 116 are not provided since they are not germane to the inventive embodiments described herein.

The processor 104 of the host system 102 may execute various applications, for example, an e-mail server application, databases, and other application types. Data for various applications may be shared between the computing systems 122 and stored at the storage devices 126. Information may be sent via ports of the switch 120. The term "port" as used herein includes logic and circuitry for receiving, processing, and transmitting information.

Each device (e.g., the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of the host system 102 and interface (not shown) for the storage devices 126. Fabric ports are typically located in Fabric devices, such as the switch element 120. Details regarding the switch element 120 are provided below.

Figure 2A:
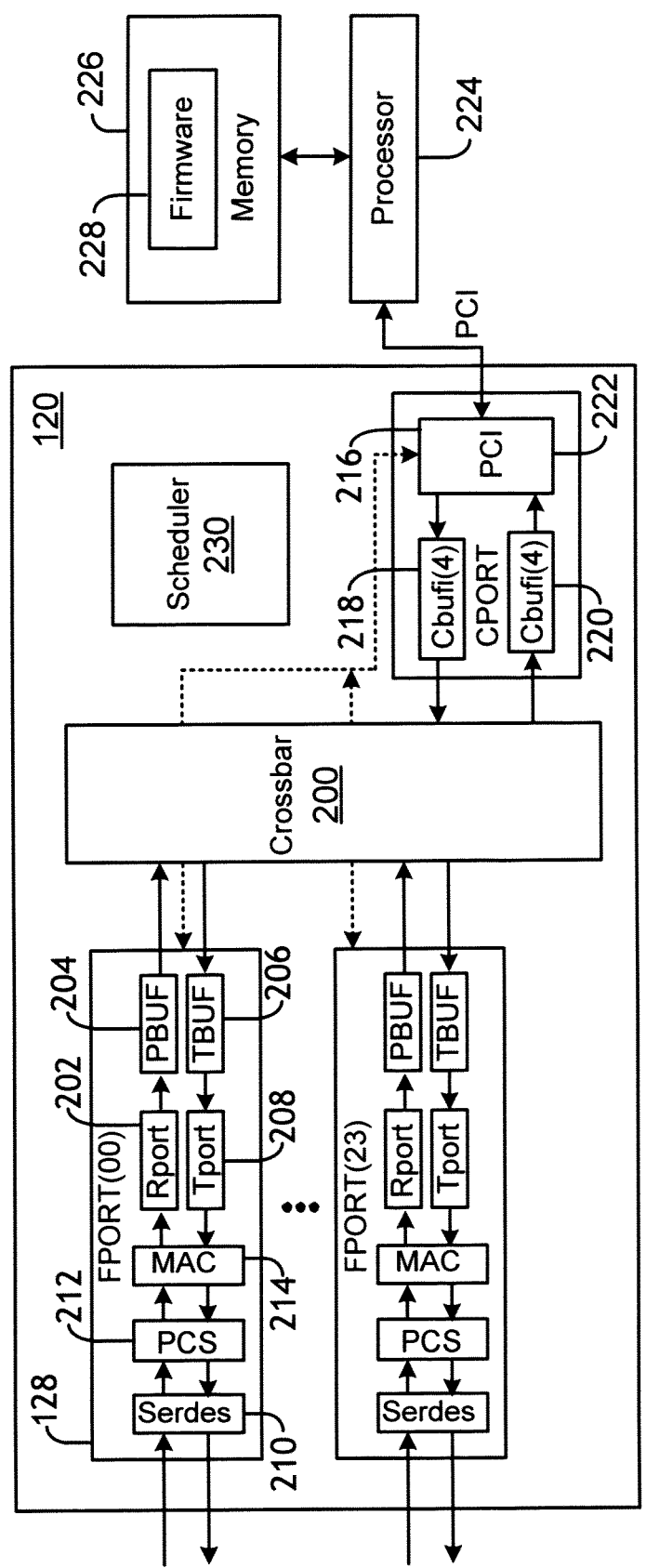
FIG. 2A is a functional block diagram of a switch element according to the present embodiments.

FIG. 2A is a high-level block diagram of the switch element 120, also referred to as the switch 120. Switch element 120 may be implemented as an application specific integrated circuit (ASIC) having a plurality of ports 128. Ports 128 are generic (GL) ports and may include an N_Port, F_Port, FL_Port ("Fabric Loop" port), E-Port, or any other port type. The ports 128 may be configured to operate as Fibre Channel, FCoE, or Ethernet ports. In other words, depending upon what it is attached to, each GL port can function as any type of port. As an example, the ports 128 of FIG. 2A are drawn on the same side of the switch element 120. However, the ports 128 may be located on any or all sides of the switch element 120. This does not imply any difference in port or ASIC design. The actual physical layout of the ports will depend on the physical layout of the ASIC.

Ports 128 communicate via a time shared crossbar 200, which includes a plurality of switch crossbars for handling specific types of data and data flow control information. For illustration purposes only, the switch crossbar 200 is shown as a single crossbar. The switch crossbar 200 may be a connectionless crossbar (packet switch) of conventional design, sized to connect a plurality of paths. This is to accommodate the ports 128 plus a control port (CPORT) 216 for connection to a processor 224 that may be external to the switch element 120. In another embodiment, the processor 224 may be located within a switch chassis that houses the switch element 120.

Each port 128 receives incoming frames (or information) and processes the frames according to various protocol requirements. The port 128 includes a shared, time-multiplexed pipeline for receiving frames (or information). The pipeline includes a serializer/deserializer (SERDES) 210, a physical coding sub-layer (PCS) 212, and a time-multiplexed media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT)) 202.

The RPORT 202 temporarily stores received frames at a memory storage device, shown as PBUF (pause buffer) 204. The frames are then sent to a transmit segment (or transmit port (TPORT)) 208 via the crossbar 200. The TPORT 208 includes a memory device shown as a transmit buffer (TBUF) 206. The TBUF 206 is a temporary memory storage device used to stage frames or information related to frames before being transmitted. The TPORT 208 may share the MAC 214 and the PCS 212 with the RPORT 202. The SERDES 210 at TPORT 208 is used to convert parallel data into a serial stream (the SERDES 210 may also be shared with the RPORT 202).

The switch element 120 may also include the control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit frames or instructions from the processor 224 to the ports 128. The CPORT 216 further includes an output buffer (CBUFO) 220, which is used to send frames from the PBUFs 204, the TBUFs 206, and CBUFI 218 that are destined to processor 224.

Port 128 described above may be referred to as a "Base-Port" that may have more than one network link available for receiving and transmitting information. Each network link allows the Base-Port to be configured into a plurality of Sub-Ports, each uniquely identified for receiving and sending frames. The configuration may vary based on protocol and transfer rates. For example, port 128 may be configured to operate as four single lane Ethernet ports; three single lane Ethernet ports and one single lane Fibre Channel port; two single lane Ethernet ports and two single lane Fibre Channel ports; one single lane Ethernet port and three single lane Fibre Channel ports; four single lane Fibre Channel ports, two double lane Ethernet ports; 1 double lane Ethernet port and two single lane Ethernet ports; one double lane Ethernet port, one single lane Ethernet port and one single lane Fibre Channel port; one double lane Ethernet port and two single lane Fibre Channel ports; one four lane (i.e., quad lane) Ethernet port; or one four lane (i.e., quad lane) Fibre Channel port. Port 128 uses some logic that is shared among the multiple Sub-Ports and some logic that is dedicated to each Sub-Port.

Figure 2B:
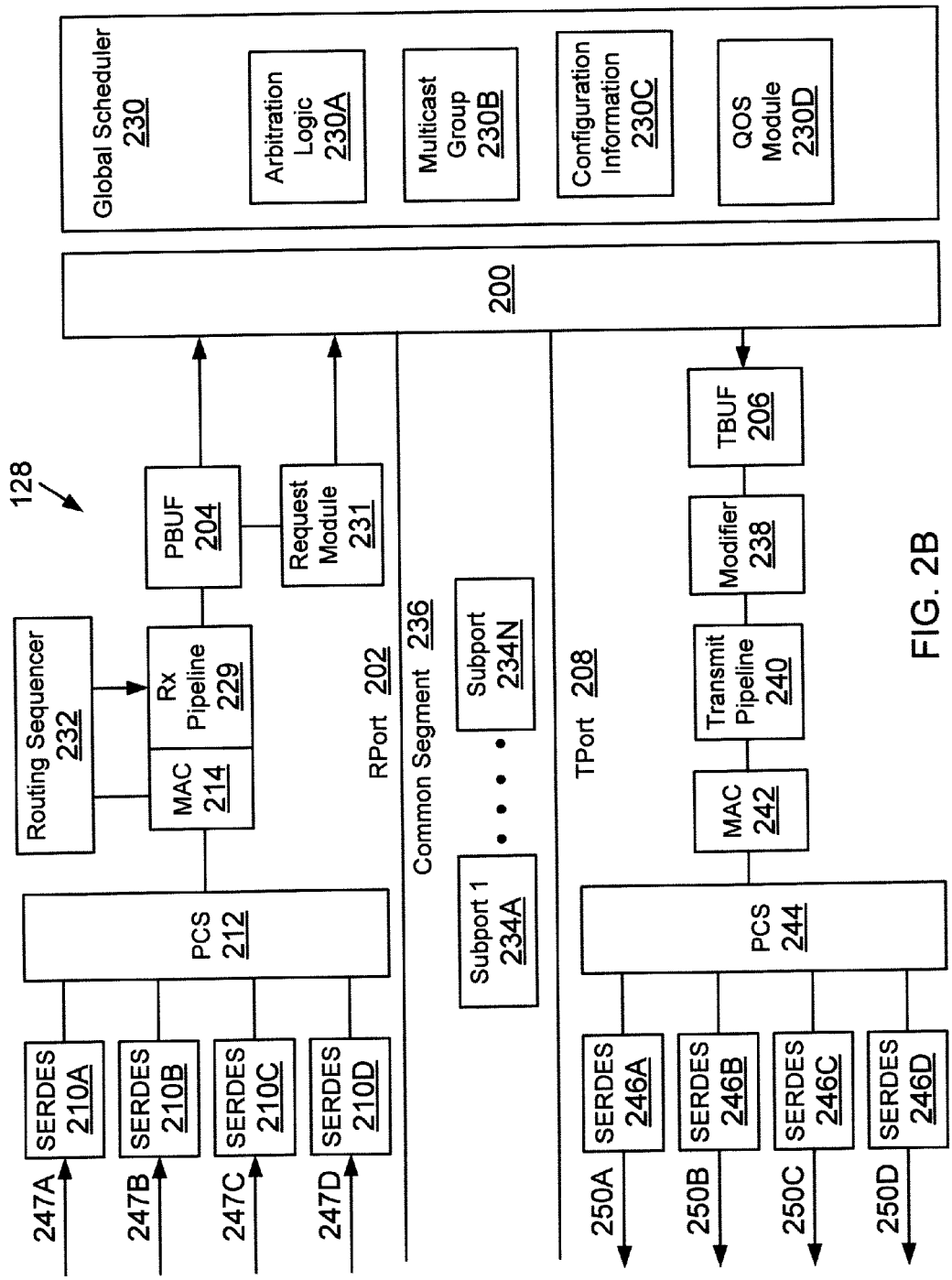
FIG. 2B shows a block diagram of a port including a plurality of Sub-Ports, according to the present embodiments.

FIG. 2B shows an example of Base-Port 128 having RPORT 202, TPORT 208 and a common segment 236, according to one embodiment. RPORT 202 is used for receiving and processing frames, while TPORT 208 is used for transmitting frames. Common segment 236 is used to store configuration and status information that may be commonly used among different components of Base-Port 128.

In one embodiment, Base-Port 128 may be configured to include a plurality of Sub-Ports. The configuration, status and statistics information/logic 234A-234N for each Sub-Port may be stored in the common segment 236. The configuration logic 234A-234N may include routing look up tables or other data structures for storing configuration information.

RPORT 202 may include or is coupled to a plurality of network links, for example, four independent physical network links 247A-247D, each configured to operate as a portion of an independent Sub-Port within Base-Port 128. The physical links may be referred to as Lane A, B, C and D. In the Ethernet standards, the links may be referred to as lane 0, 1, 2 and 3.

Each network link is coupled to a SERDES 210-210D that share PCS 212 and MAC 214. The multiple lanes also share a receive pipeline (Rx pipeline) 229 that is used for pre-processing received frames before they are transferred. Both MAC 214 and receive pipelines 229 are time multiplexed so that they can be shared among the plurality of links based on how the ports are configured to operate. In one embodiment, PCS 212 and MAC 214 may be a part of the receive pipeline 229.

Incoming frames are received via one of the network links 247A-247D. A received frame is processed by the appropriate SERDES 210A-210D and then sent to the shared PCS 212. After PCS 212 processes the frame, the frame is provide to MAC 214 that is time shared among a plurality of Sub-Ports. This means that for a certain time segment (for example, one or more clock cycles), MAC 214 may be used by one of the Sub-Ports. After the MAC module 214 processes the frame, the frame is sent to receive pipeline 229 that is also time shared.

Information regarding the frame or a copy of the frame is also provided to a routing sequencer 232 that determines a destination for the received frame. In one embodiment, a frame whose destination is processor 224 is given the highest priority, followed by a frame that is routed by a TCAM (ternary content addressable memory) or steering registers located within the routing sequencer 232. It is noteworthy that more than one routing sequencer 232 may be used for each Base-Port 128. Frames that are ready to be sent out are then staged at PBUF 204. PBUF 204 may have a plurality of queues (or slots) that may be referred to as receive queues. The receive queues temporarily store frames, until a request to move the frame is granted.

When a Sub-Port is configured to operate as a Fibre Channel port, then credit is issued by the port based on the space that is available at PBUF 204. The Sub-Port issues R_RDYs or VC_RDYs depending on whether virtual lanes are being used at any given time.

To move frames from the receive queues; a request module 231 generates requests to a global scheduler 230, also referred to as scheduler 230. Request module 231 maintains a data structure (not shown) that tracks a number of requests that may be pending for each Sub-Port. Request module 231 also removes requests from the data structure when a grant is received for a particular request.

Scheduler 230 includes arbitration logic 230A that performs dual stage arbitration for requests from various Base-Ports. Scheduler 230 also maintains a data structure at a memory labeled as multicast group 230B. The data structure stores information for identifying multicast groups that may receive multicast frames (i.e., frames that are destined to multiple destinations). Scheduler 230 stores configuration information 230C for various ports and some of that information may be used to select requests. Global scheduler 230 uses the information for processing requests that involve multicast frames. Global scheduler 230 further includes a quality of service (QOS) module 230D that monitors QOS data and provides QOS for various Sub-Ports.

Frames for transmission via TPORT 208 move via TBUF 206 and a modifier 238. In one embodiment, modifier 238 may be used to insert or remove information from an outgoing frame. The modification is based on the frame type. The time shared transmit pipeline 240 and MAC 242 are used to process outgoing frames. PCS 244, SERDES 246A-246D are used similar to PCS 212 and SERDES 210A-210D. Network links 250A-250D are similar to links 247A-247D, except links 250A-250D are used to transmit frames. It is noteworthy that although separate PCS and MAC have been shown for RPORT 202 and TPORT 208, the same PCS 212 and MAC 214 logic may be time shared and used in the receive and transmit paths, as seen in FIG. 2A.

IEEE Ethernet Standard 802.3 includes a Clause 73 which provides for auto-negotiation between bi-directionally linked network devices. Auto-negotiation is a process that enables a network device to detect the abilities (i.e. modes of operation) supported by a network device on the other end of a bi-directional link, determine common abilities, and configure for joint operation. During IEEE Clause 73 Auto-Negotiation, ports of a first network device advertise their capabilities via the network link to the ports of the network device on the other end of the link (also referred to as a link partner). The Auto-negotiation capabilities are defined by the Clause 73 IEEE Standard 802.3 that is incorporated herein by reference in its entirety. Auto-negotiation allows the network devices to perform automatic configuration to achieve the best possible mode of operation over the network link.

Clause 73 Auto-Negotiation was developed for fixed configuration ports (i.e., ports which are fixed and permanently set at being only a quad lane port; only a two dual lane port; only one dual lane and two single lane port; or only four single lane ports). Ports 128 that are capable of being configured in a variety of lane configurations (i.e., the port has the capability to be configured as a quad lane, two dual lane, one dual lane and two single lane, or four single lane ports) face challenges for Clause 73 Auto-Negotiation. The IEEE Ethernet Standard does not provide for Clause 73 auto-configuration where ports have the capability to be configured in a variety of lane configurations. If ports of a network device are capable of being configured in a variety of lane configurations, the link partner network device does not know what type of port it is dealing with since the ports of the network device have not yet been configured for transmitting frames to (or receiving frames from) the link partner. For example, in one embodiment, a network device (e.g., a network switch) includes twenty four (24) Base-Ports 128 where each Base-Port includes a plurality of Sub-Ports that can be configured as one quad lane; two dual lane; one dual lane and two single lane; or four single lane Sub-Ports. During Clause 73 Auto-Negotiation, each lane of the ports have to advertise the correct capabilities to the link partner network device in order to match the possible configurations.

The IEEE Ethernet Standard 802.3 also requires that "lane 0" of a port be used for Clause 73 Auto-Negotiation. However, when lanes are physically swapped at a port of a network device, a network device needs to know which lane of a particular configurable port is going to be lane 0 for purposes of auto-negotiation. IEEE Ethernet Standard 802.3 does not provide a solution for this situation. Thus, if the lane order is allowed to be swapped (e.g., for improved printed circuit board (PCB) routing (i.e., laying out PCBs so that they are as small as possible and as efficient as possible)) then the Ethernet standard does not provide for a mechanism to easily identify lane 0. In one embodiment, as described below, the IEEE Ethernet Standard 802.3 Clause 73 Auto-Negotiation process is modified to deal with configurable ports 128 of a network device.

The following description provides for a method, system and network device for negotiating between a network device (in this example, a network switch capable of receiving/transmitting Ethernet information over a network link) and a particular link partner (that is, another network device capable of receiving/transmitting Ethernet information over the network link such as, without limitation, a server, a peripheral, an input/output subsystem, a bridge, a hub, a router, storage device(s), computing system(s) or another switch) when ports of one or even both network devices are capable of being configured in a variety of lane configurations and/or the lane order of one or more ports is swapped.

Figure 3:
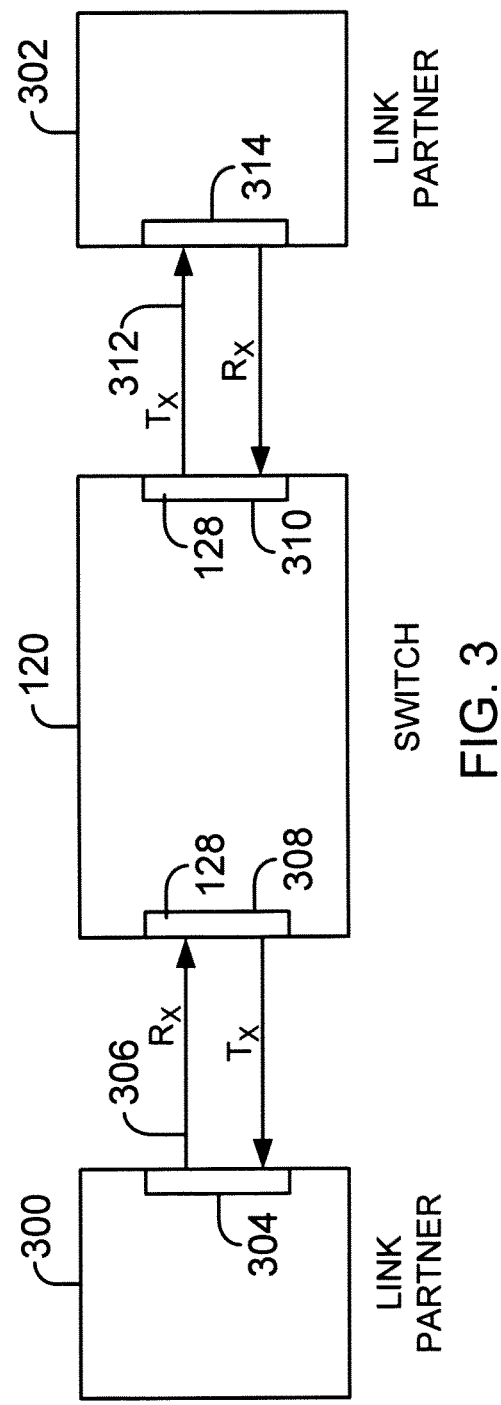
FIG. 3 shows a block diagram of communication between a network switch element and two network devices, according to one embodiment.

FIG. 3 illustrates communication between a network device (e.g., a network switch element 120) and two other network devices (or link partners) 300, 302 over bi-directional links, where each link partner network device 300, 302 may be any one of, without limitation, a server, a peripheral, an input/output subsystem, a bridge, a hub, a router, storage device(s), computing system(s), or another switch. The number of network devices that the switch 120 is engaging in auto-negotiation with can vary at any given time. The switch 120 and network devices 300, 302 may be part of the system 100. The goal is to configure a transmitting or a source Ethernet port 304 from a first network device 300 to transmit frames 306 to a receiving or destination port 308. The destination port may be a Base-Port 128 or a Sub-Port of the network switch element 120. The ultimate destination of the frames 306 may be a second network device 302. Likewise, a source Ethernet port 310 on the switch 120 also needs to be configured to transmit frames 312 to a receiving or destination port 314 on the second network device 302. Ethernet frames could also be received at the switch 120 from the second network device 302 that are destined for the first network device 300. In either situation, there is Clause 73 Auto-Negotiation between the switch 120 and each of the network devices 300, 302 in order to configure the switch 120 and network devices 300, 302 for frames to be transmitted between the switch 120 and each network device 300, 302. Alternatively, the network devices 300, 302 may be transmitting frames to the switch 120 that are ultimately intended for destinations other than the other network device 302, 300 (i.e., ultimately destined for other network devices connected to the network).

The processor 224 executes firmware code 228 that determines if at least one port 128 of the switch 120, where the port 128 includes a plurality of Sub-Ports 234A-234D, is auto-negotiation enabled. The processor 224 determines what potential lane configuration(s) (i.e., one quad lane, two dual lane, one dual lane and two single lane, or four single lane ports) the port 128 can be configured for. The processor 224 then configures for the particular lane configuration allowed by the port 128. During this configuration process, the processor 224 determines if lanes of the port 128 are physically swapped by identifying which one or more of the Sub-Ports (or links) will operate as lane 0 for communicating with a particular lane 0 of the network device 300 and 302. Once it is determined if lanes of the port 128 are physically swapped, the processor 224 then sets any one or more of the Sub-Ports as one quad lane, two dual lane, one dual lane and two single lane, or four single lane ports.

The processor 224 or other module processes auto-negotiation for the lanes. This includes the processor 224 or other module obtaining capabilities of the link partner network device 300, 302 and then matching the capabilities of the switch 120 and the network device 300, 302. Once the processor 224 or other module matches the capabilities of the link partners, the processor 224 or other module then selects the highest priority of matching capabilities. Both the switch port and the link partners are performing the same process of selecting the highest priority of matching capabilities. Both ends of each link arrive at the same port configurations as they are both using the same or similar algorithm as defined by IEEE Clause 73 Auto-Negotiation. At the end of auto-negotiation, port configurations of the switch 120 and each network device 300, 302 are set.

Figure 4:
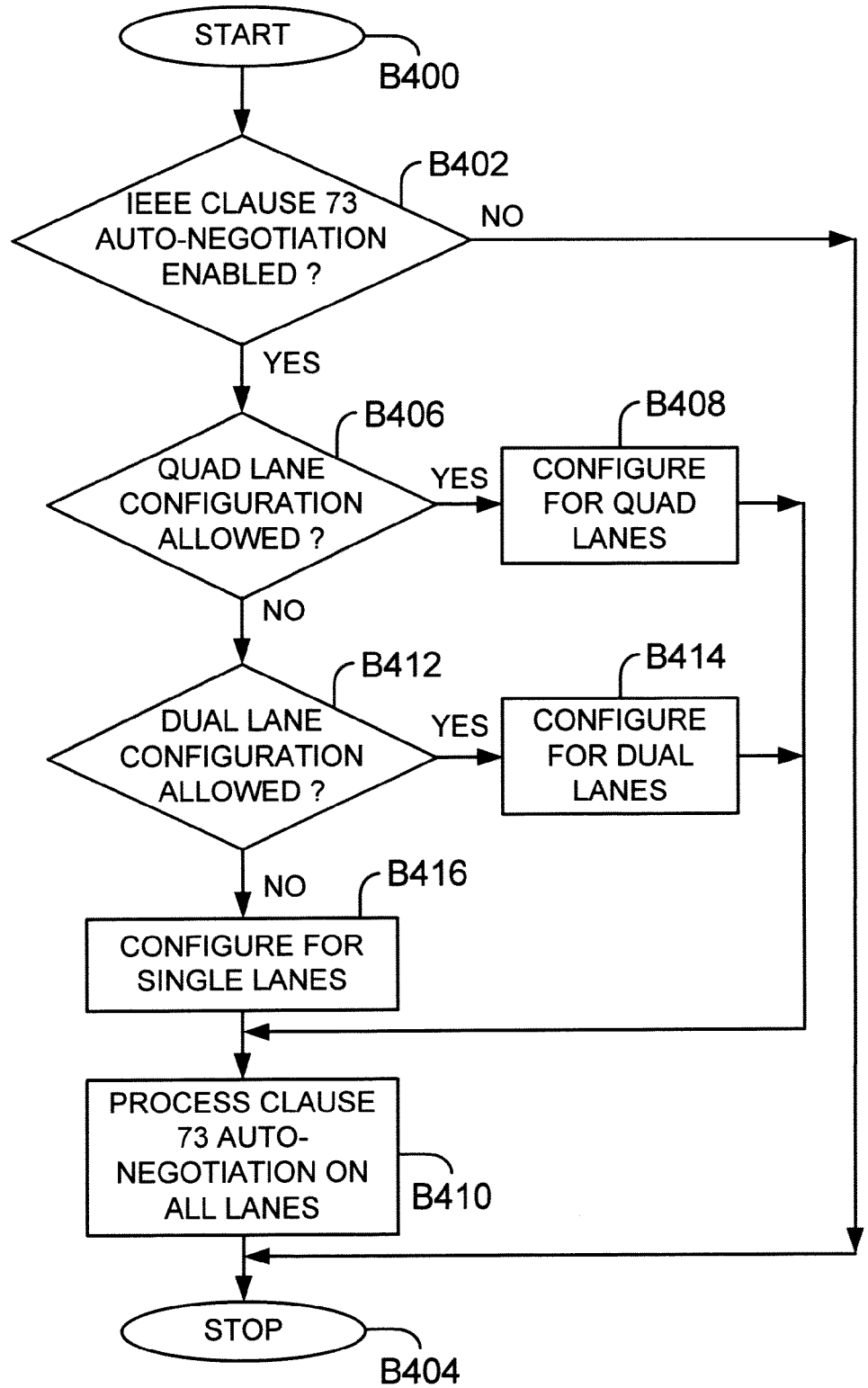
FIG. 4 shows a top level auto-negotiation process flow, according to an embodiment.

FIG. 4 shows a process, according to one embodiment, for Clause 73 Auto-Negotiation involving at least one network device (for example, switch 120) having configurable ports. The process steps may be executed by processor 224 or other module of the switch element 120. The process begins in block B400. In block B402, the process determines if the port 128 (or Sub-Port) is IEEE Clause 73 Auto-Negotiation enabled. This may be enabled by setting configuration parameters at the common segment 236. If not, the process proceeds to block B404 and is done. If yes, the process proceeds to block B406 and determines if a quad lane port configuration is allowed. If yes, then in block B408, the Sub-Port's IEEE Clause 73 Auto-Negotiation capabilities are configured to support quad lane, dual lane and single lane ports at the supported link rates, as described in more detail below in reference to FIG. 5, and the process proceeds to block B410.

If it is determined in block B406 that quad lane port configurations are not allowed, the process proceeds to block B412 and determines if dual lane port configurations are allowed. If yes, then in block B414, the Sub-Port's IEEE Clause 73 Auto-Negotiation capabilities are configured to support dual lane and single lane ports at the support link rates, as described in more detail below in reference to FIG. 6, and the process then proceeds to block B410.

If it is determined in block B412 that dual lane port configurations are not allowed, the process proceeds to block B416 and the Sub-Port's IEEE Clause 73 Auto-Negotiation capabilities are configured to support single lane ports at the support link rates, as described in more detail below in reference to FIG. 7. Thereafter, the process proceeds to block B410.

In block B410, IEEE Clause 73 Auto-Negotiation is processed on all lanes, described in more detail below in reference to FIG. 8. Thereafter, the process proceeds to block B404 and is done.

Figure 5:
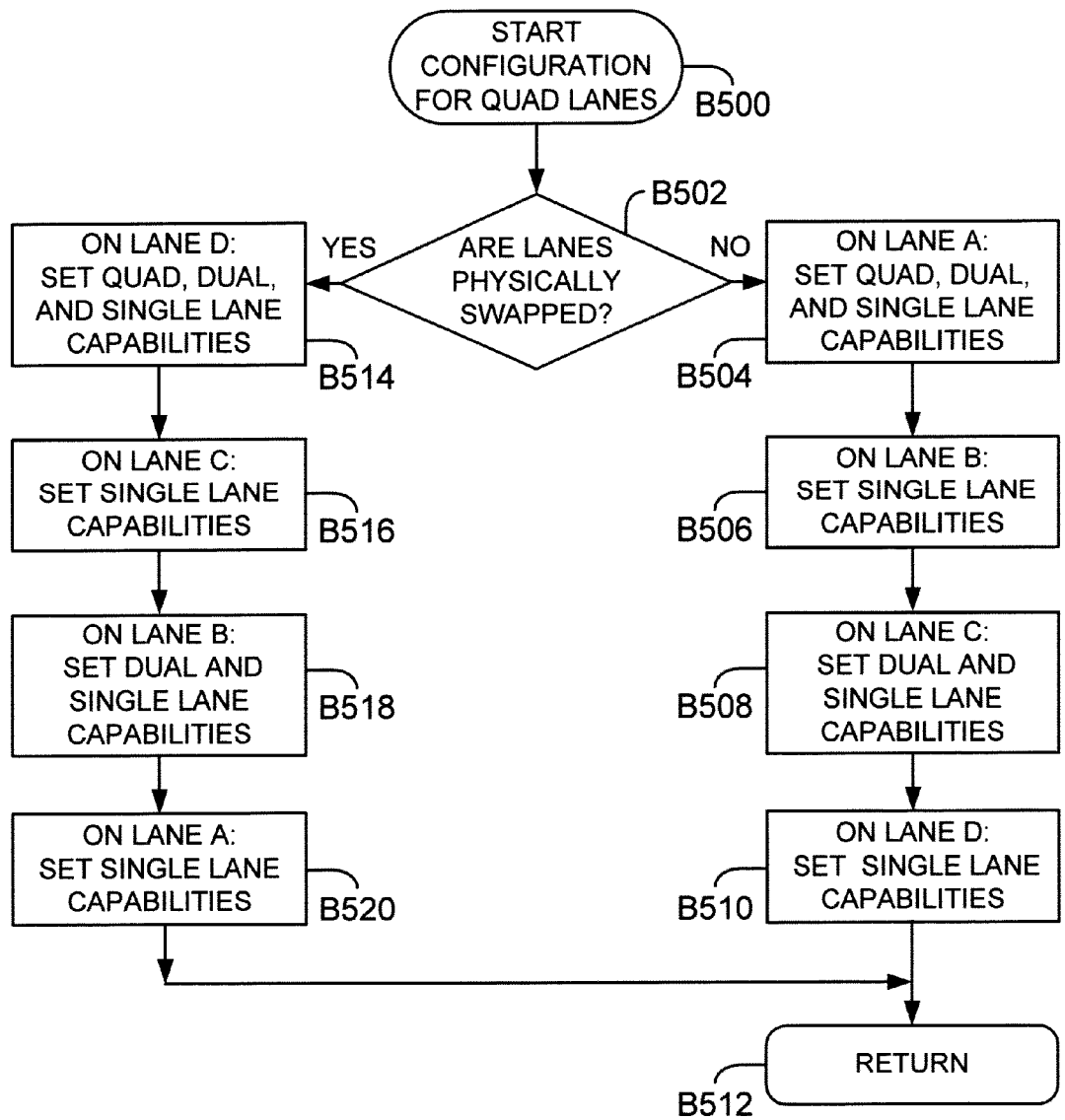
FIG. 5 shows a flow diagram of for quad lane configuration, according to an embodiment.

FIG. 5 shows a process, according to one embodiment, for configuring a Sub-Port's IEEE Clause 73 Auto-Negotiation capabilities to support quad lane, dual lane and single lane ports at, as referenced above in block B408 of FIG. 4. The process steps may be executed by processor 224 or other modules of the switch element 120. The process begins in block B500. In block B502, the process determines if the lanes (e.g., Lane A, Lane B, Lane C, and Lane D) of port 128 are physically swapped. If not, the process proceeds to block B504 where quad lane, dual lane, and single lane capabilities are set on Lane A. The process then proceeds to block B506 where single lane capabilities are set on Lane B. Next, the process proceeds to block B508 where dual lane and single lane capabilities are set on Lane C. The process next proceeds to block B510 where single lane capabilities are set on Lane D. The process then proceeds to block B512 which then returns to the process of FIG. 4 where the process proceeds to block B410.

If it is determined in block B502 that the lanes are physically swapped, the process proceeds to block B514 where quad lane, dual lane, and single lane capabilities are set on Lane D. The process then proceeds to block B516 where single lane capabilities are set on Lane C. Next, the process proceeds to block B518 where dual lane and single lane capabilities are set on Lane B. The process next proceeds to block B520 where single lane capabilities are set on Lane A. The process then proceeds to block B512 which then returns to the process of FIG. 4 where the process proceeds to block B410.

Figure 6:
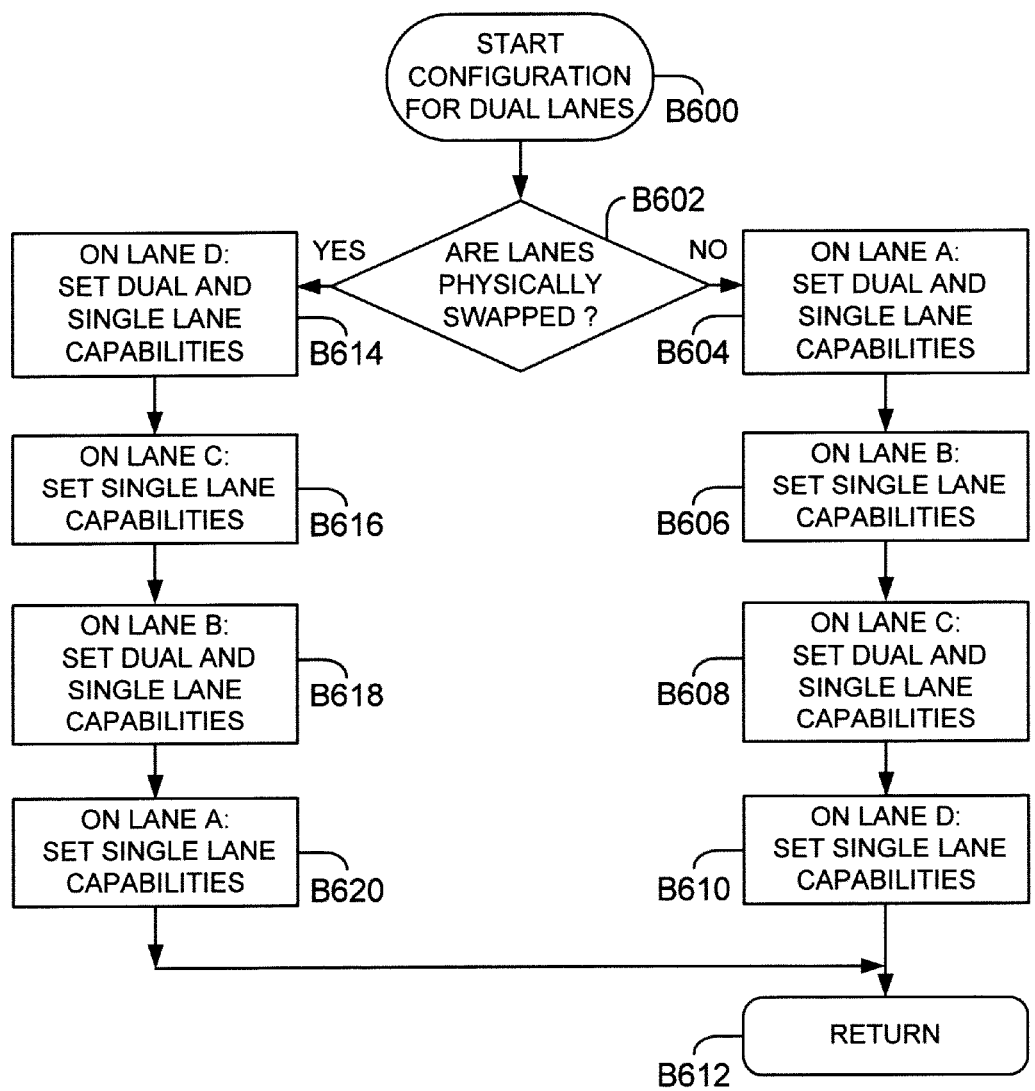
FIG. 6 shows a flow diagram of the dual lane configuration, according to an embodiment.

FIG. 6 shows a process, according to one embodiment, for configuring a Sub-Port's IEEE Clause 73 Auto-Negotiation capabilities to support dual lane and single lane ports at the supported link rates, as referenced above in block B414 of FIG. 4. The process steps may be executed by processor 224 or other modules of the switch element 120. The process begins in block B600. In block B602, the process determines if the lanes (e.g., Lane A, Lane B, Lane C, and Lane D) of the port 128 are physically swapped. If not, the process proceeds to block B604 where dual lane and single lane capabilities are set on Lane A. The process then proceeds to block B606 where single lane capabilities are set on Lane B. Next, the process proceeds to block B608 where dual lane and single lane capabilities are set on Lane C. The process next proceeds to block B610 where single lane capabilities are set on Lane D. The process then proceeds to block B612 which then returns to the process of FIG. 4 where the process proceeds to block B410 for processing of Clause 73 Auto-Negotiation on all lanes.

If it is determined in block B602 that the lanes are physically swapped, the process proceeds to block B614 where dual lane and single lane capabilities are set on Lane D. The process then proceeds to block B616 where single lane capabilities are set on Lane C. Next, the process proceeds to block B618 where dual lane and single lane capabilities are set on Lane B. The process next proceeds to block B620 where single lane capabilities are set on Lane A. The process then proceeds to block B612 which then returns to the process of FIG. 4 where the process proceeds to block B410 for processing of Clause 73 Auto-Negotiation on all lanes.

Figure 7:
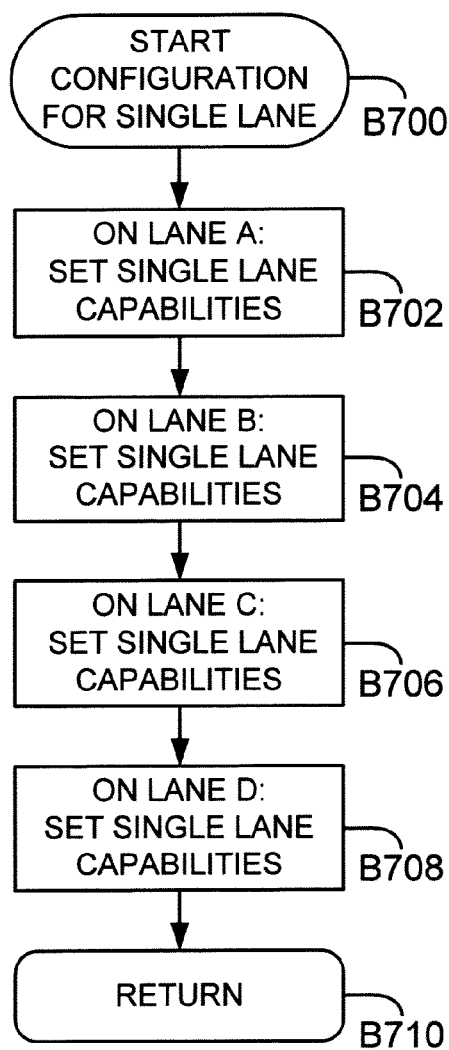
FIG. 7 shows a flow diagram of the single capabilities configuration, according to an embodiment.

FIG. 7 shows a process, according to one embodiment, for configuring a Sub-Port's IEEE Clause 73 Auto-Negotiation capabilities to support single lane ports at the support link rates, as referenced above in block B416 of FIG. 4. The process steps may be executed by processor 224 or other modules of the switch element 120. The process begins in block B700. The process proceeds to block B702 where single lane capabilities are set on Lane A. The process then proceeds to block B704 where single lane capabilities are set on Lane B. Next, the process proceeds to block B706 where single lane capabilities are set on Lane C. The process next proceeds to block B708 where single lane capabilities are set on Lane D. The process then proceeds to block B710 which then returns to the process of FIG. 4 where the process proceeds to block B410 for processing of Clause 73 Auto-Negotiation on all lanes.

Figure 8:
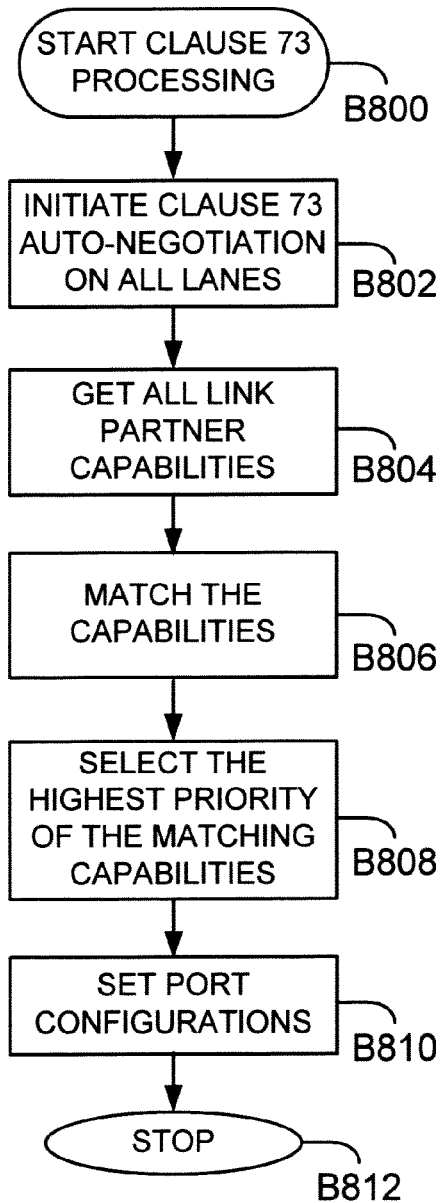
FIG. 8 shows a process flow diagram of Clause 73 Auto-Negotiation, according to an embodiment.

FIG. 8 shows a process, according to one embodiment, for IEEE Clause 73 Auto-Negotiation on all lanes (e.g., the Sub-Ports 234A-234D) of port 128, as referenced above in block B410 of FIG. 4. The process steps may be executed by processor 224 or other modules of the switch element 120. The process begins in block B800. The process proceeds to block B802 where Clause 73 Auto-Negotiation is initiated on all lanes. The process then proceeds to block B804 where the network switch element 120 obtains capabilities as defined by IEEE Clause 73 Auto-Negotiation, yet to be defined and any proprietary user defined capabilities of the link partner network device (e.g., network device 300).

Next, the process proceeds to block B806 where the processor 224 matches the capabilities of the link partner network device with the capabilities of the network switch element 120. The process next proceeds to block B808 where the processor 224 or other module selects the highest priority of the matching capabilities of the link partner network device and the network switch element 120. If there are no matching capabilities found then IEEE Clause 73 Auto-Negotiation fails and other methods are used to determine the link configuration to use. This failure will also occur if the link partner does not support IEEE Clause 73 Auto-Negotiation. The process then proceeds to block B810 where the processor 224 sets the configurations of the port 128. Once port configurations are set, the process stops (block B812 of FIG. 8, block B404 of FIG. 4) and the transmission of frames between the network switch element 120 and the link partner commences.

Figure 9A:
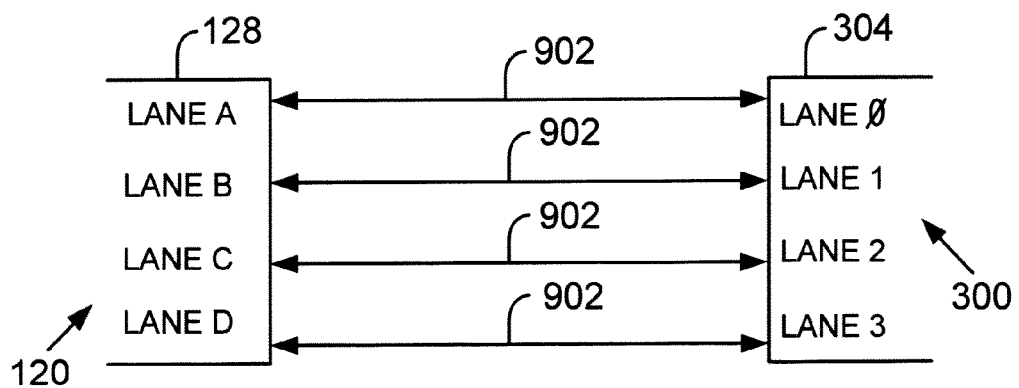
FIGS. 9A and 9B illustrate, respectively, a quad lane configuration without physical lane swapping, and a quad lane configuration with physical lane swapping, according to an embodiment.
Figure 9B:
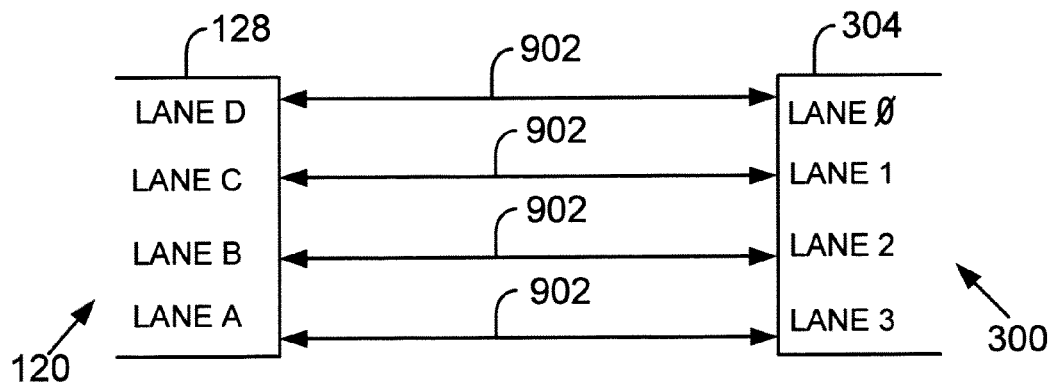

FIGS. 9A and 9B illustrate, respectively, communication between a network device (e.g., a network switch element 120) and a link partner network device over bi-directional links 902 after Clause 73 Auto-Negotiation where there is quad lane port configuration without physical lane swapping, and quad lane port configuration with physical lane swapping. In FIG. 9A, where there is no lane swapping in the port 128 of the network switch element 120, Lane A of the port 128 communicates with Lane 0 of a port of a link partner network device (e.g., Lane 0 of a port 304 of network device 300). In FIG. 9B, where there has been lane swapping in the port 128 of the network switch element 120, it is Lane D of the port 128 that communicates with Lane 0 of the port 304 of the network device 300.

Figure 10A:
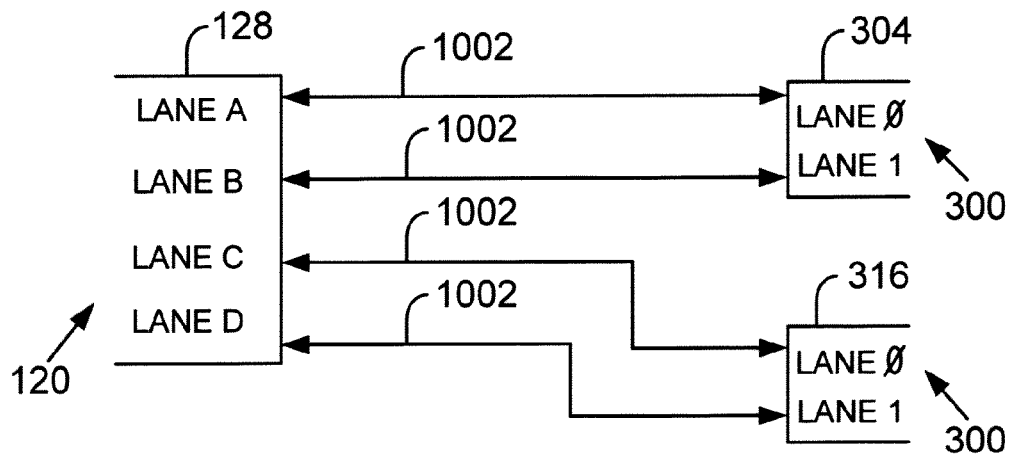
FIGS. 10A and 10B illustrate, respectively, a two dual lane configuration without physical lane swapping, and a two dual lane configuration with physical lane swapping, according to an embodiment.
Figure 10B:
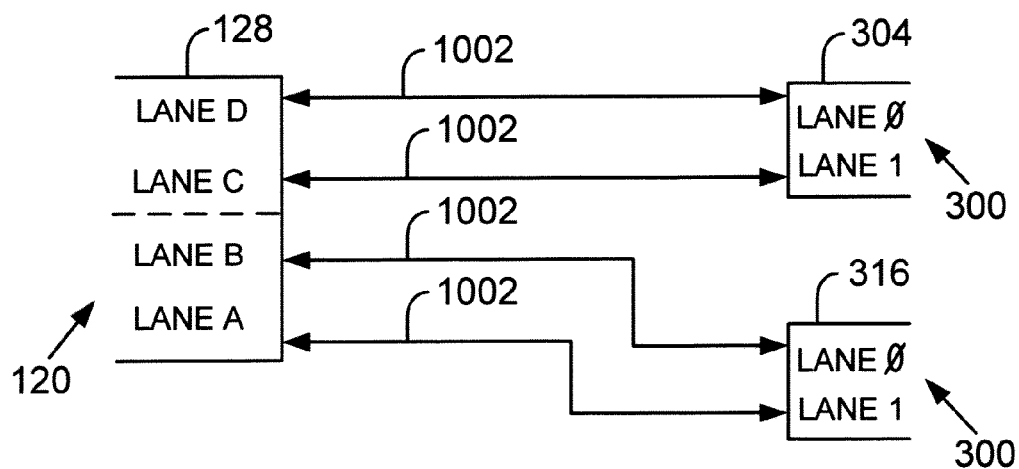

FIGS. 10A and 10B illustrate, respectively, communication between a network device (e.g., a network switch element 120) and one or more link partner network devices over bi-directional links 1002 after Clause 73 Auto-Negotiation where there is two dual lane port configuration of the network switch element 120 without physical lane swapping, and two dual lane port configuration of the network switch element 120 with physical lane swapping. Lanes A and B comprise one dual lane Sub-Port and Lanes C and D comprise the other Sub-Port of the port 128. In FIG. 10A, where there is no lane swapping in the port 128 of the network switch element 120, Lane A of the port 128 communicates with Lane 0 of a port (dual lane) of a link partner network device (e.g., Lane 0 of a dual lane port 304 of the network device 300) and Lane C of the port 128 that communicates with Lane 0 of another (dual lane) port 316 of network device 300 (alternatively, Lane C of the port 128 could be communicating with Lane 0 of dual lane port 314 of the network device 302). In FIG. 10B, where there has been lane swapping in the port 128 of the network switch element 120, it is Lane D of the port 128 that communicates with Lane 0 of the dual lane port 304 of the network device 300 and Lane B of the port 128 that communicates with Lane 0 of the dual lane port 316 of the network device 300 (alternatively, Lane B of the port 128 could be communicating with Lane 0 of the dual lane port 314 of the network device 302).

Figure 11A:
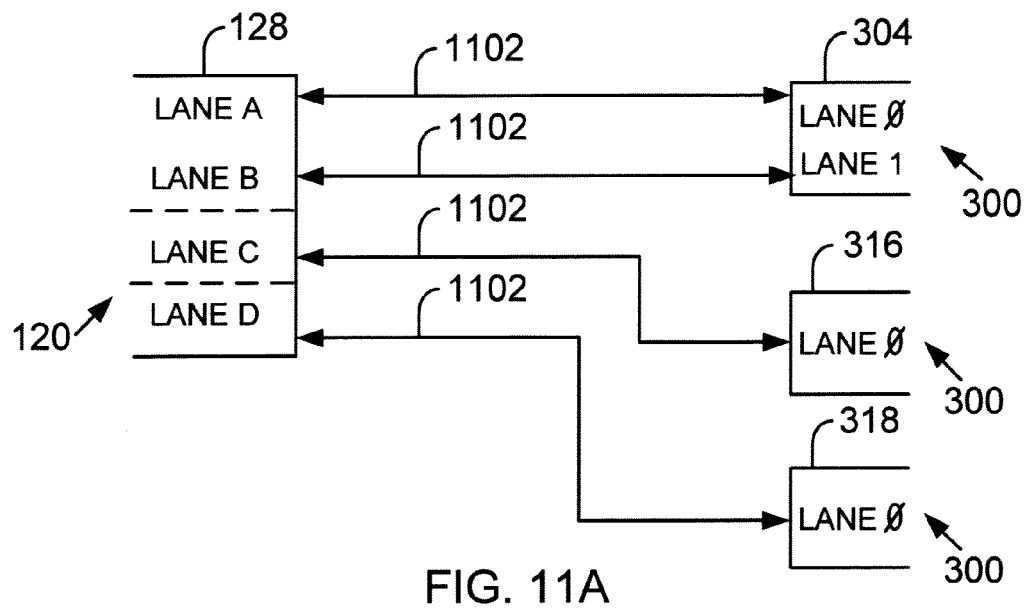
FIGS. 11A and 11B illustrate, respectively, a dual lane and two single lane configuration without physical lane swapping, and a dual lane and two single lane configuration with physical lane swapping, according to an embodiment.
Figure 11B:
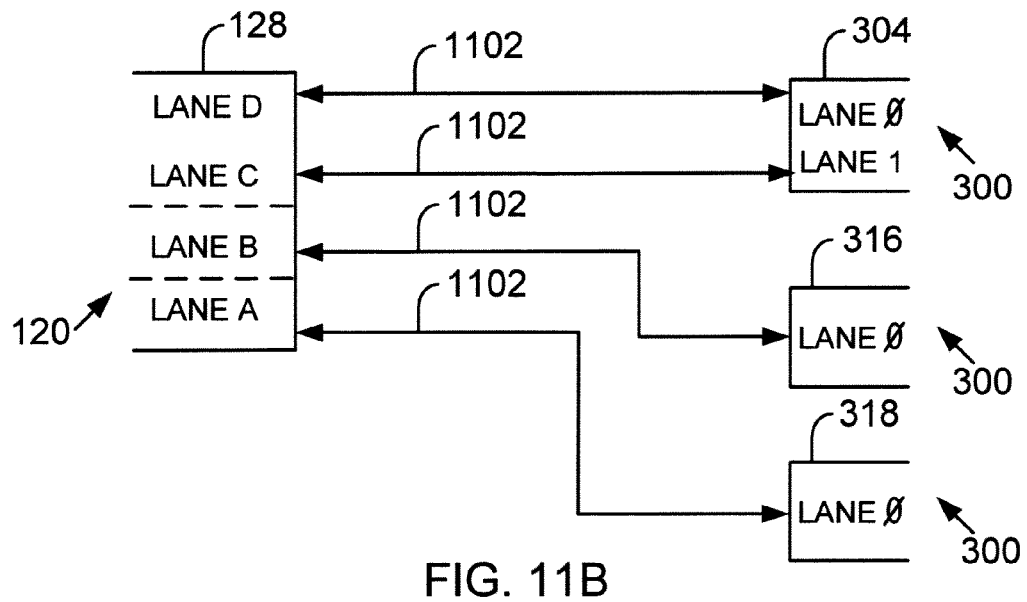

FIGS. 11A and 11B illustrate, respectively, communication between a network device (e.g., a network switch element 120) and one or more link partner network devices over bi-directional links 1102 after Clause 73 Auto-Negotiation where there is a one dual lane and two single lane configuration of the port 128 of the network switch element 120 without physical lane swapping, and a dual lane and two single lane configuration of the port 128 of the network switch element 120 with physical lane swapping. Lanes A and B comprise one dual lane Sub-Port and Lanes C and D each comprise a single lane Sub-Port of the port 128. In FIG. 11A, where there is no lane swapping in the port 128 of the network switch element 120, Lane A of the port 128 that communicates with Lane 0 of a port (dual lane) of a link partner network device (e.g., Lane 0 of a dual lane port 304 of the network device 300). Lane C (single lane) of the port 128 communicates with a single lane port 316 of the network device 300 (alternatively, Lane C of the port 128 could be communicating with a single lane port 314 of the network device 302) and Lane D (single lane) of the port 128 communicates with another single lane port 318 of the network device 300 (alternatively, Lane D of the port 128 could be communicating with another single lane port of the network device 302). In FIG. 11B, where there has been lane swapping in the port 128 of the network switch element 120, it is Lane D of the port 128 that communicates with Lane 0 of a dual lane port 304 of the network device 300. Lane B (single lane) of the port 128 communicates with a single lane port 316 of the network device 300 (alternatively, Lane B of the port 128 could be communicating with a single lane port 314 of the network device 302) and Lane A (single lane) of the port 128 communicates with another single lane port 318 of the network device 300 (alternatively, Lane A of the port 128 could be communicating with another single lane port of the network device 302).

Figure 12A:
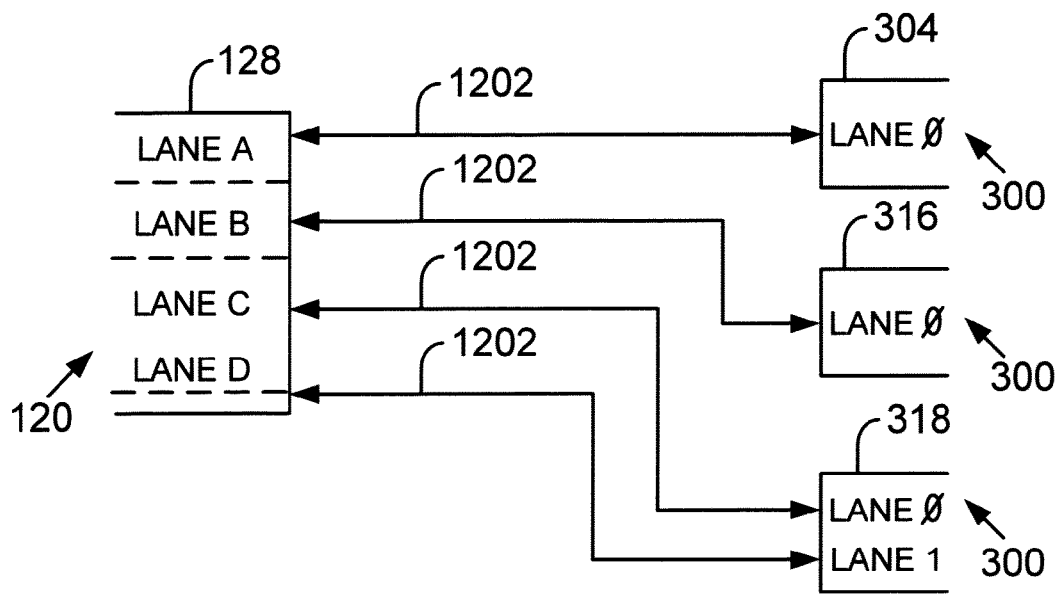
FIGS. 12A and 12B illustrate, respectively, a two single lane and a dual lane configuration without physical lane swapping, and a two single lane and a dual lane configuration with physical lane swapping, according to an embodiment.
Figure 12B:
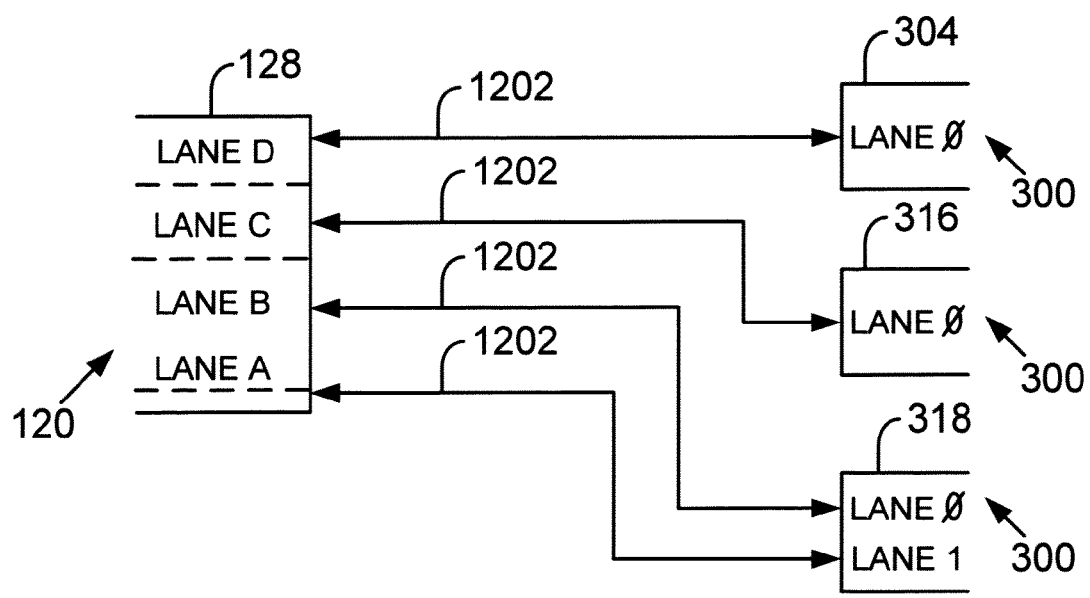

FIGS. 12A and 12B illustrate, respectively, communication between a network device (e.g., a network switch element 120) and one or more link partner network devices over bi-directional links 1202 after Clause 73 Auto-Negotiation where there is a two single lane and a dual lane configuration of the port 128 of the network switch element 120 without physical lane swapping, and a two single lane and a dual lane configuration of the port 128 of the network switch element 120 with physical lane swapping. In FIG. 12A, where there is no lane swapping in the port 128 of the network switch element 120, Lanes A and B each comprise a single lane Sub-Port, and Lanes C and D comprise one dual lane Sub-Port of the port 128. Lane A (single lane) of the port 128 communicates with Lane 0 of a port (single lane) of a link partner network device (e.g., Lane 0 of a single lane port 304 of the network device 300). Lane B (single lane) of the port 128 communicates with a single lane port 316 of the network device 300 (alternatively, Lane B of the port 128 could be communicating with a single lane port 314 of the network device 302). Lanes C and D (dual lane) of the port 128 communicate with a dual lane port 318 of the network device 300 where Lane C communicates with Lane 0 of the port 318 (alternatively, Lanes C and D of the port 128 could be communicating with another port (i.e., a dual lane port) of the network device 302). In FIG. 12B, where there has been lane swapping in the port 128 of the network switch element 120, Lanes D and C each comprise a single lane Sub-Port, and Lanes A and B comprise one dual lane Sub-Port of the port 128. Lane D of the port 128 communicates with Lane 0 of a single lane port 304 of the network device 300. Lane C (single lane) of the port 128 communicates with a single lane port 316 of the network device 300 (alternatively, Lane C of the port 128 could be communicating with a single lane port 314 of the network device 302). Lanes A and B (dual lane) of the port 128 communicate with a dual lane port 318 of the network device 300 where Lane B communicates with Lane 0 of the port 318 (alternatively, Lane B of the port 128 could be communicating with Lane 0 of a dual lane port of the network device 302).

Figure 13:
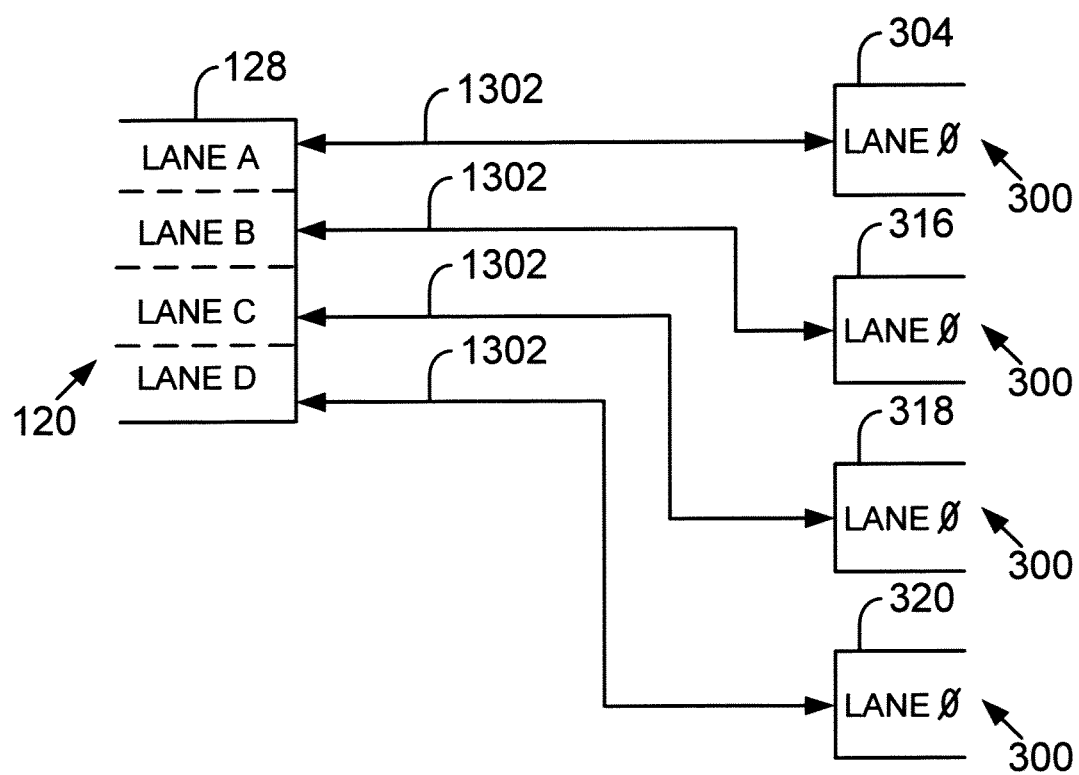
FIG. 13 illustrates a four single lane configuration, according to an embodiment.

FIG. 13 illustrates communication between a network device (e.g., a network switch element 120) and one or more link partner network devices over bi-directional links 1302 after Clause 73 Auto-Negotiation where there is a four single lane configuration of the port 128 of the network switch element 120 (physical lane swapping being irrelevant when there is a four single lane configuration of the port 128). Lanes A, B, C and D each comprise a single lane Sub-Port of the port 128. Lane A (single lane) of the port 128 communicates with Lane 0 of a port (single lane) of a link partner network device (e.g., Lane 0 of a single lane port 304 of the network device 300). Lane B (single lane) of the port 128 communicates with a single lane port 316 of the network device 300 (alternatively, Lane B of the port 128 could be communicating with a single lane port 314 of the network device 302, or a single lane port of yet another network device). Lane C (single lane) of the port 128 communicates with a single lane port 318 of the network device 300 (alternatively, Lane C of the port 128 could be communicating with another single lane port of the network device 302, or a single lane port of yet another network device). Lane D (single lane) of the port 128 communicates with a single lane port 320 of the network device 300 (alternatively, Lane D of the port 128 could be communicating with yet another single lane port of the network device 302, or a single lane port of yet another network device).

In one embodiment, a configurable Base-Port 128 is provided that has the flexibility of operating in multiple configurations and handling Ethernet frames. When physical lanes are swapped, the network device uses a process to select a lane that operates as lane "0" to perform auto-negotiation for the port.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the foregoing embodiments may be implemented in adapters, network interface cards and other similar devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine implemented method for auto-negotiation between a first network device and a second network device connected to a network, comprising:
   determining if auto-negotiation is enabled for a first port of the first network device having a plurality of Sub-Ports; wherein each of the plurality of Sub-Ports is coupled to a network link from among a plurality of network links and can be configured to operate as independent ports for sending and receiving information using one or more of the plurality of network links at a plurality of rates complying with a plurality of protocols including a network protocol and a storage protocol;
   configuring the plurality of Sub-Ports as one quad lane port using at least four network links, two dual lane ports each using two network links, one dual lane port using two network links and two single lane ports each using a single network link, or four single lane ports each using a single network link;
   identifying an auto-negotiation lane for the first port communicating with an auto-negotiation lane of the second network device, when lanes of the first port are physically swapped, where the identified auto-negotiation lane for the first port is based on the configuration of the plurality of Sub-Ports of the first port as one quad lane port, two dual lane ports, one dual lane and two single lane ports and four single lane ports; and
   performing auto-negotiation for the first port using the identified auto-negotiation lane.

2. The method of claim 1, further comprising setting capabilities of each Sub-Port.

3. The method of claim 1, wherein performing auto-negotiation further comprising: obtaining capabilities of the second network device for the auto-negotiation.

4. The method of claim 1, wherein performing auto-negotiation further comprising: matching capabilities of the first and second network devices; and selecting highest priority of the matching capabilities.

5. The method of claim 1, wherein the plurality of Sub-Ports share hardware logic of the first port and use dedicated logic for each Sub-port for sending and receiving information.

6. The method of claim 1, wherein the network device is a switch coupled to one or more devices.

7. The method of claim 1, wherein one of the plurality of Sub-Ports is configured to operate as an Ethernet port and perform Clause 73 Auto-Negotiation after the auto-negotiation lane is identified.

8. A first network device coupled to a second network device via a plurality of network links, comprising:
   a processor for executing firmware code; and a first port having a plurality of Sub-Ports where of the plurality of Sub-Ports is coupled to a network link from among a plurality of network links and can be configured to operate as independent ports for sending and receiving information using one or more of the plurality of network links at a plurality of rates complying with a plurality of protocols including a network protocol and a storage protocol;
   wherein the processor executable firmware: determines if auto-negotiation is enabled for the first port; configures the plurality of Sub-Ports as one quad lane port using at least four network links, two dual lane ports each using two network links, one dual lane port using two network links and two single lane ports each using a single network link, or four single lane ports each using a single network link; identifies an auto-negotiation lane for the first port communicating with an auto-negotiation lane of the second network device, when lanes of the first port are physically swapped, where the identified auto-negotiation lane for the first port is based on the configuration of the plurality of Sub-Ports of the first port as one quad lane port, two dual lane ports, one dual lane and two single lane ports and four single lane ports; and performs auto-negotiation for the first port using the identified auto-negotiation lane; and
   wherein the processor sets capabilities of each Sub-Port; obtains capabilities of the second network device; matches capabilities of the first and second network devices and selects highest priority of matching capabilities.

9. The network device of claim 8, wherein port configurations of each network device are set.

10. The network device of claim 8, wherein the network device is a switch coupled to one or more devices.

11. The network of claim 8, wherein one of the plurality of Sub-Ports is configured to operate as an Ethernet port and perform Clause 73 Auto-Negotiation after the auto-negotiation lane is identified.

12. A non-transitory, machine readable storage medium having stored thereon instructions for performing a method for auto-negotiation between a first network device and a second network device connected to a network, comprising machine executable code which when executed by at least one machine, causes the machine to:
   determine if auto-negotiation is enabled for a first port of the first network device having a plurality of Sub-Ports; wherein each of the plurality of Sub-Ports is coupled to a network link from among a plurality of network links and can be configured to operate as independently-as-a ports for sending and receiving information using one or more of the plurality of network links at a plurality of rates complying with a plurality of protocols including a network protocol and a storage protocol;
   configure the plurality of Sub-Ports as one quad lane port using at least four network links, two dual lane ports each using two network links, one dual lane port using two network links and two single lane ports each using a single network link, or four single lane ports each using a single network link;
   identify an auto-negotiation lane for the first port communicating with an auto-negotiation lane of the second network device, when lanes of the first port are physically swapped, where the identified auto-negotiation lane for the first port is based on the configuration of the plurality of Sub-Ports of the first port as one quad lane port, two dual lane ports, one dual lane and two single lane ports and four single lane ports; and
   perform auto-negotiation for the first port using the identified auto-negotiation lane.

13. The non-transitory, storage medium of claim 12, the machine executable code further causes the machine to set capabilities of each Sub-Port.

14. The non-transitory, storage medium of claim 12, wherein performing auto-negotiation further comprising: obtaining capabilities of the second network device for the auto-negotiation.

15. The non-transitory, storage medium of claim 12, wherein performing auto-negotiation further comprising:

matching capabilities of the first and second network devices; and selecting highest priority of the matching capabilities.

16. The non-transitory, storage medium of claim 12, wherein the plurality of Sub-Ports share hardware logic of the first port and use dedicated logic for each Sub-port for sending and receiving information.

17. The non-transitory, storage medium of claim 12, wherein the network device is a switch coupled to one or more devices.

18. The non-transitory, storage medium of claim 12, wherein one of the plurality of Sub-Ports is configured to operate as an Ethernet port and perform Clause 73 Auto-Negotiation after the auto-negotiation lane is identified.

* * * * *